United States Patent Office.

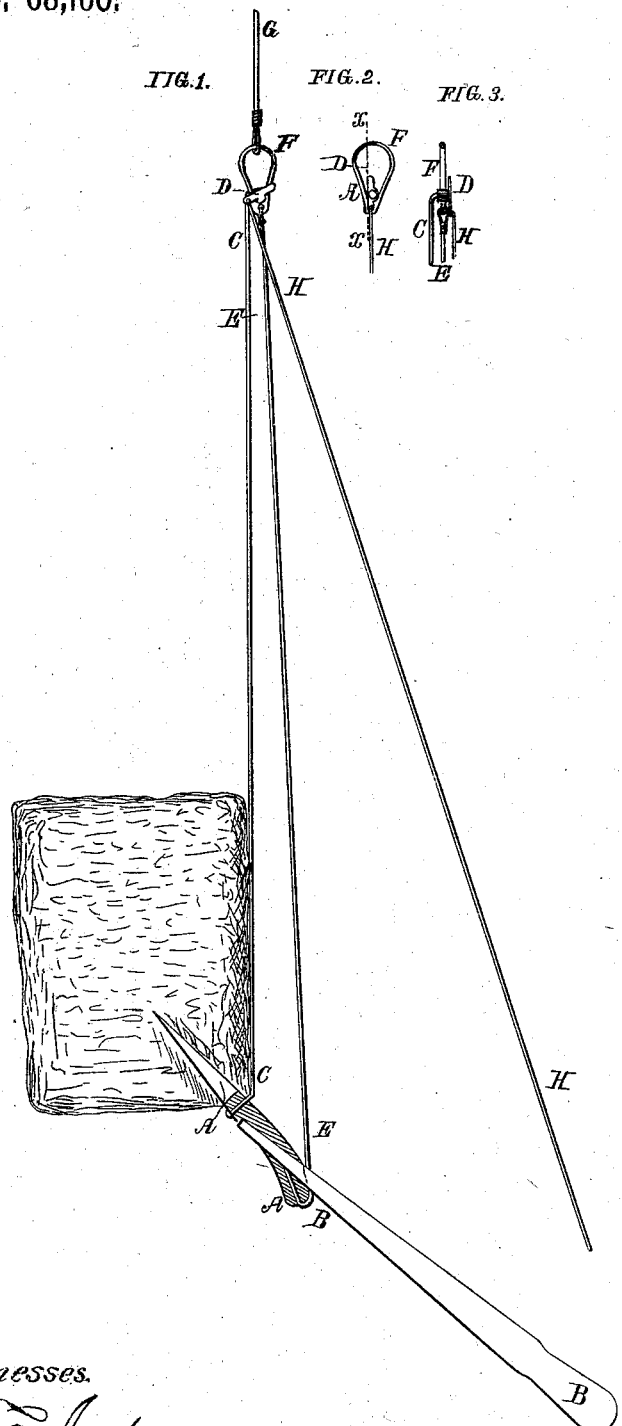

CHARLES D. BLINN, OF PORT HURON, MICHIGAN.

Letters Patent No. 68,160, dated August 27, 1867.

---

IMPROVEMENT IN HORSE HAY-FORKS.

---

*The Schedule referred to in these Letters Patent and making part of the same.*

---

TO ALL WHOM IT MAY CONCERN:

Be it known that I, CHARLES D. BLINN, of Port Huron in the county of St. Clair, and State of Michigan, have invented a new and improved Horse Hay-Fork; and I do hereby declare that the following is a full, clear, and exact description thereof, which will enable others skilled in the art to make and use the same, reference being had to the accompanying drawings, forming part of this specification, in which—

Figure 1 is a side view of my improved fork, showing it in position for raising the hay, the handle not being removed.

Figure 2 is a detail view of the loop or ring and toggle.

Figure 3 is a section of the same, taken through the line $x\ x$, fig. 2.

Similar letters of reference indicate like parts.

My invention consists in the prong constructed with a socket for the reception of the removable handle, and in the combination and arrangement of the loop or ring-toggle and ropes with each other and with the prong, as hereinafter more fully described.

A is the prong, which is made of malleable cast iron, in one piece, and substantially in the shape shown in the drawings. In this prong A is formed a socket for the reception of the handle B. From the inner end or bottom of the said socket is formed a hole or opening through the side of the prong A for the escape of the chaff, hay-seed, &c., that may find their way into it, to prevent the socket from becoming filled. C is a rope, the lower end of which is secured to the prong A at or a little in front of its middle, as shown in fig. 1, either by passing it through a hole formed therein or in some other secure and substantial manner. The other end of the rope C is attached to the toggle D by passing it through and securing it in a tubular projection formed upon the middle of one side of said toggle D, as shown in fig. 3. E is a rope, the lower end of which is secured to the rear end of the prong A, and its upper end to the lower side of the loop or ring F. G is the rope by means of which the fork and hay are raised and transported to the desired place, the lower end of which is attached to the upper side of the ring or loop F. H is a rope or cord, the upper end of which is attached to one end of the toggle D, and the other end extends down into such a position that it can be reached and operated by the person who operates the fork. The toggle D is of such a length and the loop F is so formed that when the toggle is in the position shown in fig. 1, its ends may rest against the sides of the said loop, but when turned into the position shown in fig. 2 it may readily pass through said loop. In using the fork, the toggle D being in the position shown in fig. 1, the handle B is inserted in the socket formed in the prong A. The said prong is then thrust into the hay deep enough to raise a sufficient quantity for a fork-load, and the handle B removed. The hoisting apparatus is then operated, and the fork and hay raised and transported to the desired place by the rope C; then by pulling upon the rope or cord H the toggle D is drawn into the position shown in figs. 2 and 3. This allows the weight of the hay to draw the said toggle through the loop or ring F. The prong A is then suspended point downward by the rope E attached to its rear end, and the hay falls from it by its own weight.

What I claim as new, and desire to secure by Letters Patent, is—

1. The prong A constructed with a socket for the reception of the removable handle B, substantially as herein shown and described and for the purpose set forth.

2. The combination and arrangement of the loop or ring F, toggle D, and ropes C E G H, with each other and with the prong A, substantially as herein shown and described and for the purpose set forth.

CHARLES D. BLINN.

Witnesses:
SAM'L D. PACE,
T. L. HUBBARD.